United States Patent [19]

Haldenwanger

[11] Patent Number: 5,722,732
[45] Date of Patent: Mar. 3, 1998

[54] SHOULDER BELT RETRACTOR WITH HEADREST SUPPORT

[75] Inventor: Michael John Haldenwanger, Brighton, Mich.

[73] Assignee: General Motors Corporation, Detroit, Mich.

[21] Appl. No.: 703,251

[22] Filed: Aug. 26, 1996

[51] Int. Cl.[6] .............................. B60R 21/00; B60R 22/34
[52] U.S. Cl. .................................. 297/483; 297/391
[58] Field of Search ................................ 297/483, 468, 297/473, 391; 280/802

[56] References Cited

U.S. PATENT DOCUMENTS

| | | | |
|---|---|---|---|
| 5,088,794 | 2/1992 | Iwami et al. | 297/483 |
| 5,390,982 | 2/1995 | Johnson et al. | 297/483 |
| 5,441,332 | 8/1995 | Verellen | 297/473 |
| 5,556,171 | 9/1996 | Busch | 297/483 |
| 5,564,785 | 10/1996 | Schultz et al. | 297/473 |
| 5,599,070 | 2/1997 | Pham et al. | 297/483 |

Primary Examiner—Peter M. Cuomo
Assistant Examiner—Anthony D. Barfield
Attorney, Agent, or Firm—Charles E. Leahy

[57] ABSTRACT

A new and improved shoulder belt retractor for mounting on a vehicle seat or on the vehicle body adjacent the seat and providing a headrest support shaft which cantilevers inboard from the housing of the shoulder belt retractor to support the headrest. In particular, the shoulder belt retractor has a belt reel rotatably supported between spaced apart sidewalls of a housing located outboard of the occupant seating position. The headrest support shaft is attached to and extends between the sidewalls of the housing vertically above the belt reel and cantilevers inboard from the housing to support a headrest. A belt routing pulley is rotatably journaled on the support shaft between the sidewalls of the housing and receives the belt to guide the belt over the shoulder of the seated occupant. The belt routing pulley is preferably conical in shape to redirect the belt from a vertical path aligned with the belt reel to an angled path directed diagonally over the occupant's shoulder. In addition, a plastic housing closes the shoulder belt retractor and has a belt guiding swivel escutcheon swivel mounted thereon to receive the belt exiting the belt routing pulley to further facilitate routing of the belt over the shoulder of the occupant.

5 Claims, 4 Drawing Sheets

SHOULDER BELT RETRACTOR WITH HEADREST SUPPORT

The invention relates to a shoulder belt retractor for a motor vehicle and more particularly provides a support for a headrest.

BACKGROUND OF THE INVENTION

It is well known in motor vehicles to provide a vehicle seat for seating the vehicle occupant. It is also well known to provide a shoulder belt for restraining the occupant in the seat. Furthermore, it is known to mount a headrest at the top of the seat to support the occupant's head.

SUMMARY OF THE INVENTION

The present invention provides a new and improved shoulder belt retractor for mounting on a vehicle seat or on the vehicle body adjacent the seat and providing a headrest support shaft which cantilevers inboard from the housing of the shoulder belt retractor to support the headrest. In particular, the shoulder belt retractor has a belt reel rotatably supported between spaced apart sidewalls of a housing located outboard of the occupant seating position. The headrest support shaft is attached to and extends between the sidewalls of the housing vertically above the belt reel and cantilevers inboard from the housing to support a headrest. A belt routing pulley is rotatably journaled on the support shaft between the sidewalls of the housing and receives the belt to guide the belt over the shoulder of the seated occupant. The belt routing pulley is preferably conical in shape to redirect the belt from a vertical path aligned with the belt reel to an angled path directed diagonally over the occupant's shoulder. In addition, a plastic housing closes the shoulder belt retractor and has a belt guiding swivel escutcheon mounted thereon to receive the belt exiting the belt routing pulley to further facilitate routing of the belt over the shoulder of the occupant.

BRIEF DESCRIPTION OF THE DRAWINGS

These and other objects, features and advantages become apparent upon consideration of the description of the preferred embodiment and the appended drawings in which.

DESCRIPTION OF THE PREFERRED EMBODIMENT

Figure 1:
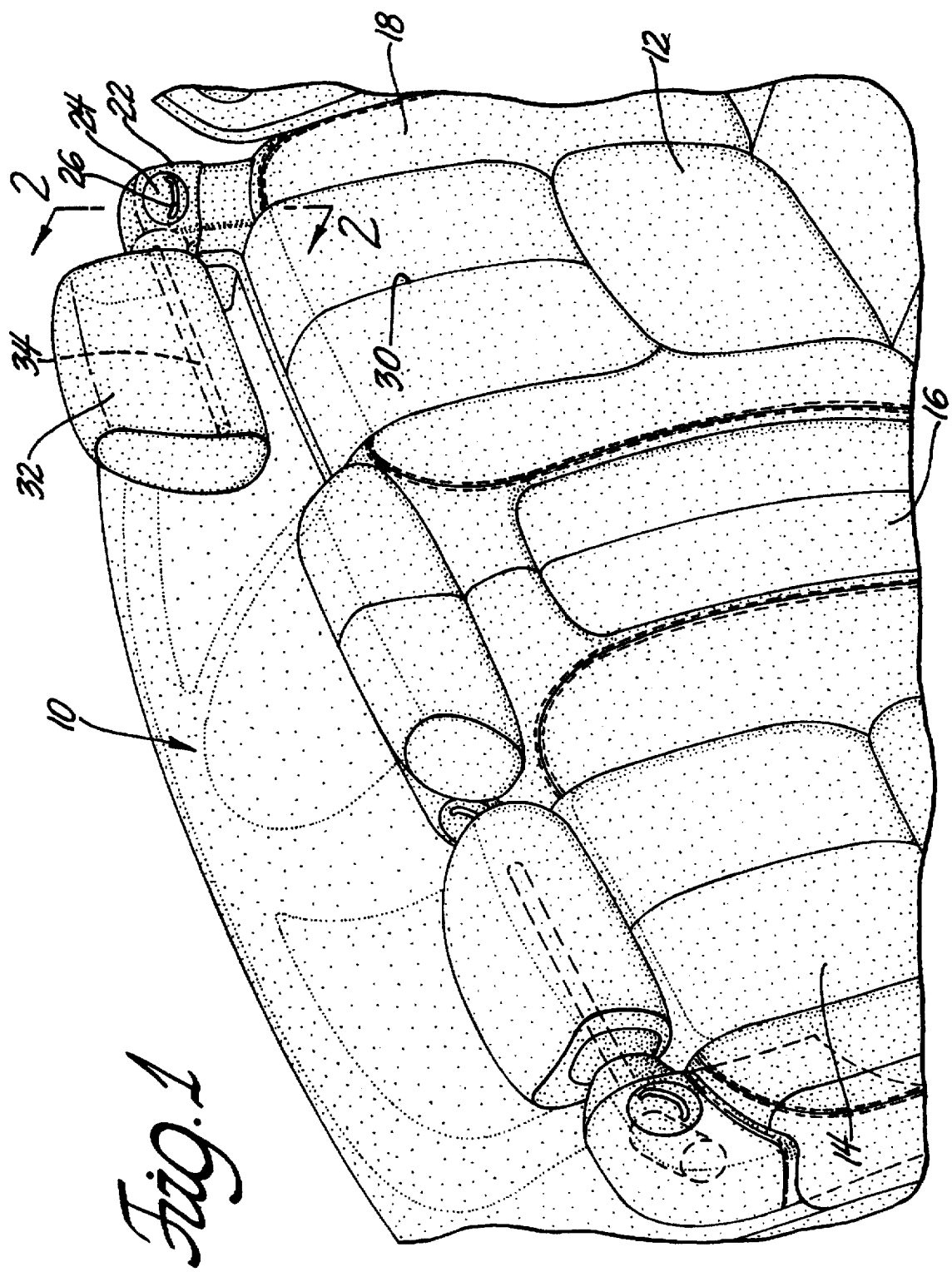
FIG. 1 is a perspective view of a vehicle rear seat having a shoulder belt retractor and headrest according to the invention.

Referring to FIG. 1, a motor vehicle includes a rear seat assembly 10 which includes outboard seat back portion 12 and 14 and a center seat back portion 16. As seen in FIG. 1, the seat back 12 includes an outboard upholstered bolster 18 which defines the outer margin of the seat. A shoulder belt tower 22 extends upwardly above the upholstered bolster 18 and includes a swivel escutcheon 24 having a slot 26 through which a shoulder belt 30 is routed to restrain an occupant, not shown. In addition, FIG. 1 shows a headrest 32 which is mounted on a support shaft 34 extending from the shoulder belt tower 22, as will be discussed in more detail herein.

Figure 2:
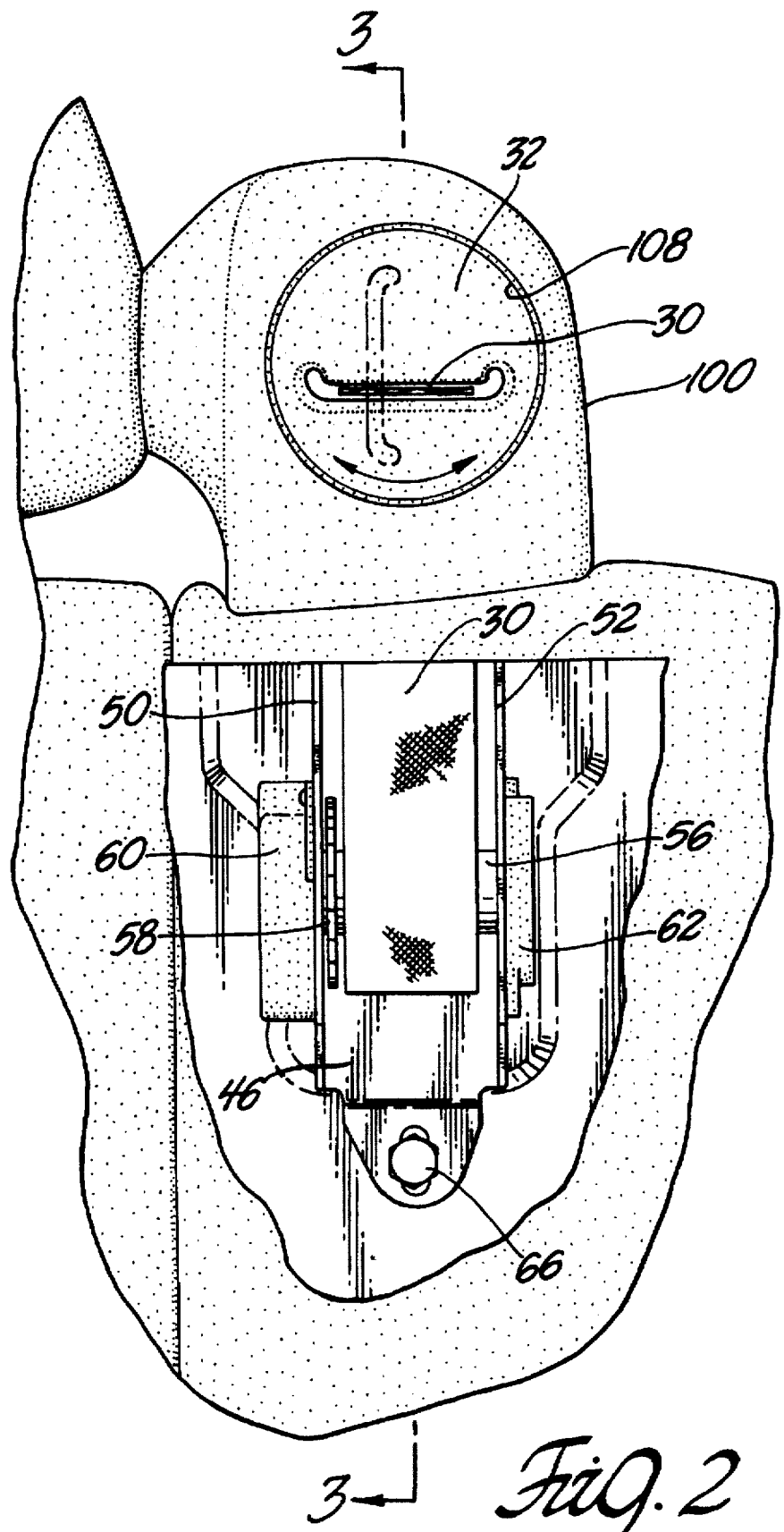
FIG. 2 is an enlarged fragmentary view taken in the direction of arrows 2—2 of FIG. 1 and having parts broken away.
Figure 3:
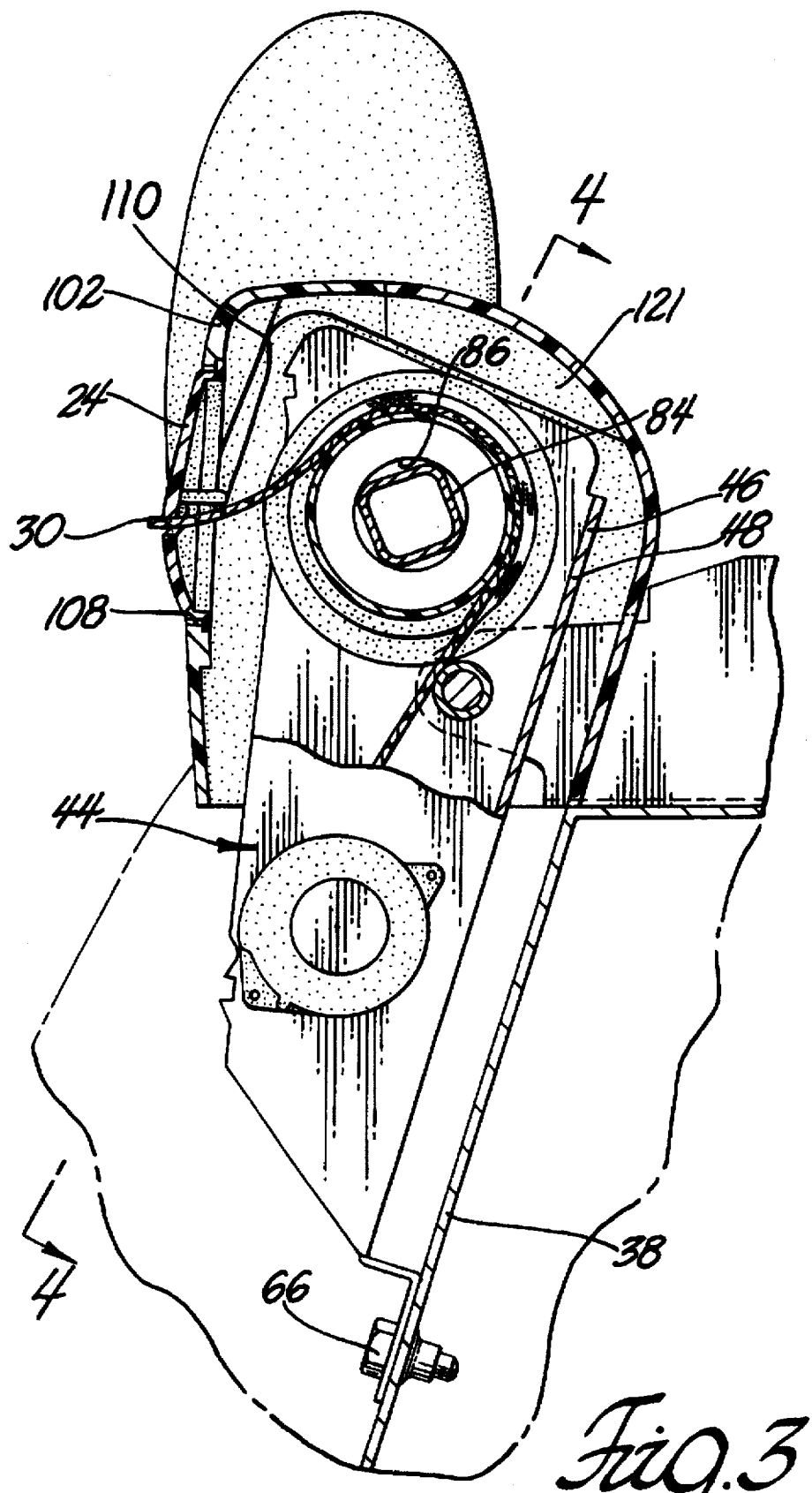
FIG. 3 is a section view taken in the direction of arrows 3—3 of FIG. 2.
Figure 4:
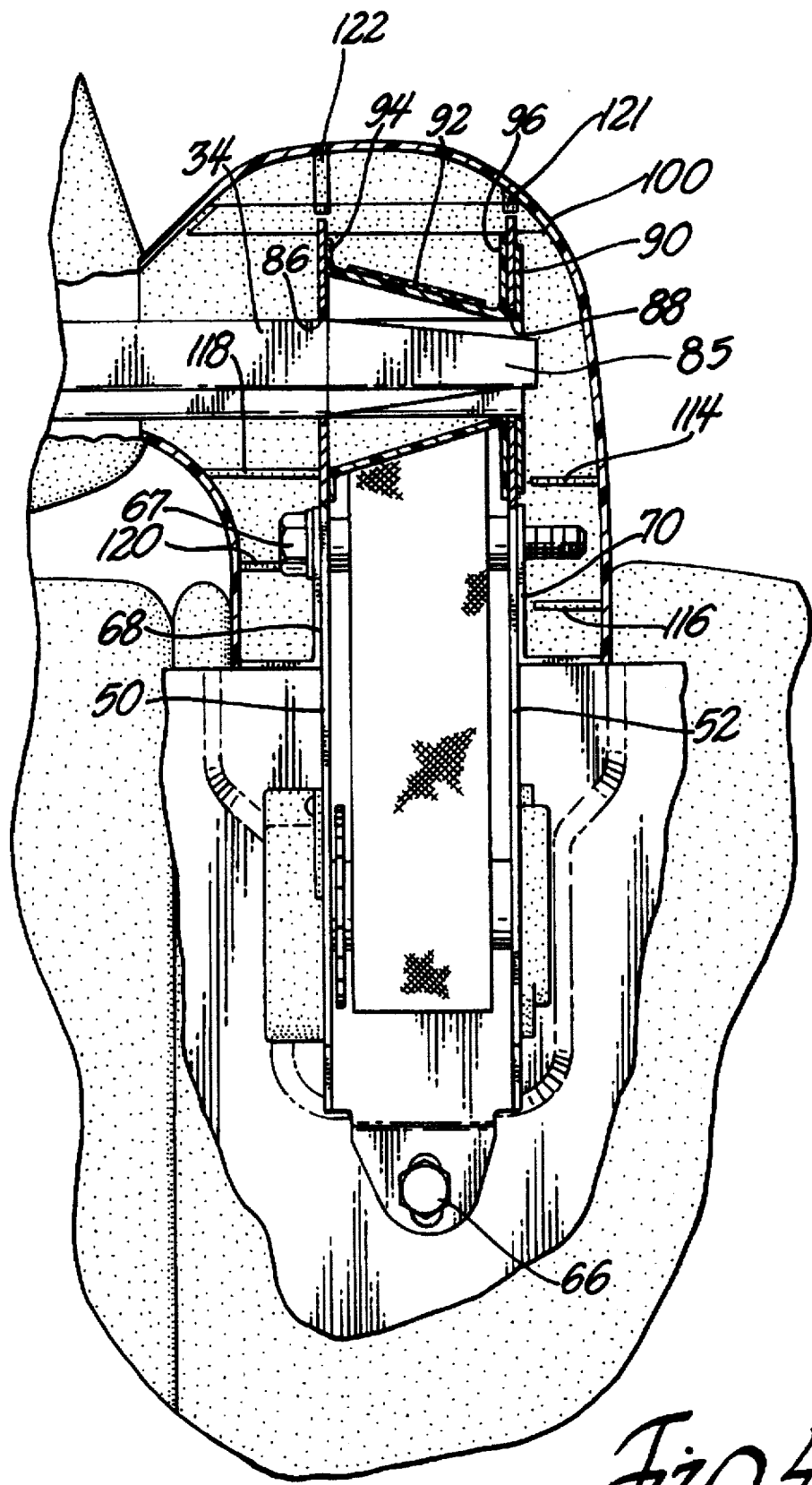
FIG. 4 is a section view taken in the direction of arrows 4—4 of FIG. 3.

Referring to FIGS. 2, 3 and 4, it is seen and understood that the vehicle seat back portions 12, 14 and 16 are supported on the underlying sheet metal structure 38 of the vehicle body.

A shoulder belt retractor assembly generally indicated at 44 includes a retractor tower housing 46 which is comprised of a base plate 48 and laterally spaced apart sidewalls 50 and 52. A conventional shoulder belt reel including a reel shaft 56, sprocket 58, reel locking mechanism 60, and rewind spring 62 is mounted on the tower frame 46. The shoulder belt 30 is conventionally attached to the reel shaft 56 and the spring assembly 62 rotates the reel shaft 56 to wind the shoulder belt 30 on the reel assembly.

As best seen in FIGS. 3 and 4, the retractor frame 46 is mounted on the body sheet metal 38 by a nut 66, and bolt 67. The upper portion of the retractor frame 46 is also anchored on the seat 38 by a pair of brackets 68 and 70 which are welded to the sheet metal panel 72 of the body sheet metal 38. A mounting bolt 78 extends through aligned apertures in the mounting brackets 68 and 70 and the sidewalls 50 and 52 of the retractor tower housing 46.

As best seen in FIG. 4, a headrest support shaft 84 has a conical end 85 which extends through apertures 86 and 88 provided in the sidewalls 50 and 52 and is fixedly attached to the side wall 52 by a nut 90. The support shaft 84 extends inwardly in cantilever fashion from the sidewalls 68 and 70 of the retractor tower housing 46 to support the headrest 32. As desired, the headrest 32 can be fixedly attached to the support shaft 34, or may alternatively be rotatably mounted thereon via either a one way racketing mechanism or a friction detent arrangement. Such rotating headrest mechanisms are well known in the prior art and accordingly not shown in the drawings of this application.

As best seen in FIGS. 3 and 4, a belt routing pulley 92 of molded plastic construction is rotatably mounted on the conical end 85 of headrest support shaft 34 between the sidewalls 50 and 52. As seen in FIG. 4, the belt routing pulley 92 is conical in shape and includes sidewalls 94 and 96. The conical shape of the belt routing pulley 92 causes the shoulder belt 30 to be redirected from the vertical orientation which it has exited the shoulder belt reel, to a diagonal orientation best suited to reach diagonally across the occupant's upper torso.

A molded plastic cover assembly 100 is provided to enclose and conceal that portion of the shoulder belt tower which extends upwardly above the upholstered seat back. In particular, as best seen in FIG. 3, the housing includes a front half 102 and a rear half 104 which suitably snap together in conventional fashion and is suitably anchored on the retractor housing. The shoulder belt 30, as best seen in FIG. 2 and 3, exits the belt routing pulley 92 and passes through a circular opening 108. As best seen in FIG. 3, the swivel escutcheon 24 is rotatably mounted within the opening 108 by an integral pivot shaft 110 of the escutcheon which snaps into a support arm 112 depending from cove assembly 100. The escutcheon plate rotates as needed to permit the shoulder belt 30 to seek optimum angular positioning across the occupant upper torso. A lattice of energy absorbing webs such as shown at 114, 116, 118, and 120 in FIG. 4 are integrally molded within the housing assembly to stiffen the cover and absorb energy.

Referring again to FIG. 1, it will be seen and appreciated that the present invention, as described hereinbefore, provides a unique appearing and functioning shoulder belt retractor and headrest arrangement. It will be understood that although the retractor assembly and headrest support of the invention are shown herein as mounted on the sheet metal structure 38 of the vehicle, the retractor assembly can also be mounted on the seat structure, particularly if the invention is used in the front seat.

I claim:

1. In a vehicle shoulder belt retractor of the type having a belt reel rotatably supported between spaced apart sidewalls of a retractor housing, the improvement comprising:

a headrest support shaft attached to and extending between the spaced apart sidewalls of the retractor housing vertically above the belt reel and extending inboard from the retractor housing to support a headrest; and a belt routing pulley rotatably mounted on the headset support shaft wherein, an end of the headrest support shaft extends completely through the belt routing pulley and between the sidewalls of the retractor housing and belt routing pulley receives a belt to guide the belt.

2. The shoulder belt retractor of claim 1 further characterized by headrest support shaft being cantilevered inboard from the sidewalls of the retractor housing independent of any other connection with the vehicle.

3. The shoulder belt retractor of claim 1 further characterized by the belt routing pulley being conical in shape to redirect the belt from a vertical path aligned with the belt reel to an angled path directed diagonally.

4. The shoulder belt retractor of claim 3 further characterized by a plastic housing enclosing the shoulder belt retractor and having a belt guide member swivel mounted thereon to receive the belt exiting the belt routing pulley and further facilitate routing of the belt.

5. The shoulder belt retractor of claim 1 further characterized by the retractor housing being mounted on upholstered seat back and the housing being of sufficient vertical extent to enable the belt reel to be concealed within the upholstery of the seat and the belt routing pulley and headrest support shaft to be situated vertically above the upholstery of the seat back.

* * * * *